Holmes & Butler,
Fire-Proof Safe.
No. 1,822. Reissued Nov. 15, 1864.
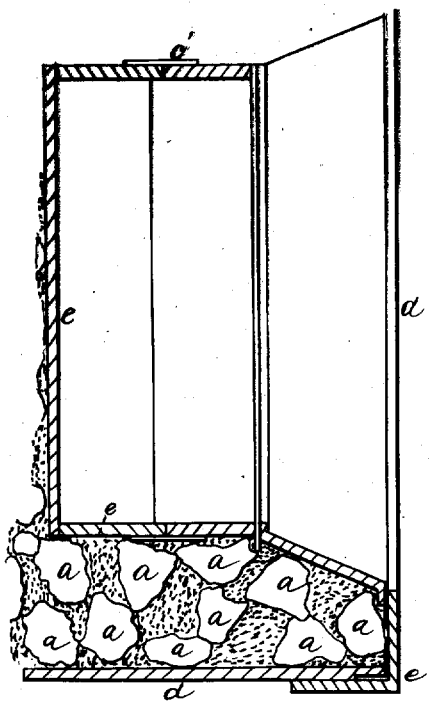
Witnesses.
Thomas L. Stetson
L. W. Stetson
Inventor
Sarah A. Holmes
[Administratrix on estate of R. S. Holmes]
A. A. Valentine
T. H. Butler

UNITED STATES PATENT OFFICE.

SARAH A. HOLMES, (ADMINISTRATRIX OF THE ESTATE OF RICHARD G. HOLMES,) ALFRED A. VALENTINE, AND WM. H. BUTLER, OF NEW YORK, N. Y., ASSIGNEES OF RICHARD G. HOLMES AND WM. H. BUTLER.

IMPROVEMENT IN FIRE-PROOF FILLING FOR SAFES.

Specification forming part of Letters Patent No. 12,594, dated March 27, 1855; Reissue No. 1,822, dated November 15, 1864.

*To all whom it may concern:*

Be it known that RICHABD C. HOLMES and WILLIAM H. BUTLRR, of the city, county, and State of New York, have invented certain new and useful improvements in the fire-proof filling of safes, bank and other doors, and other so-called "fire-proof" structures; and we do hereby declare that the following is a full, clear, and exact description of the same, reference being had to the accompanying drawing, forming part of this specification, which represents a section of a portion of a safe with our improved fire-proof filling, *d* representing the outer wall of iron and *e* the inner wall of wood, *a b* representing the filling, and *c c'* the packing in the joints.

The heat-resisting compound employed by us consists of a combination of clay or other earthy or incombustible matter, alum of commerce or some other salt that will melt with dry heat, and some alkaline substance. We are aware that compounds of alum and clay have been used as filling for safes, &c., and the extraordinary fire-resisting properties of alum have long been well-known, but alum when in a heated, wet, or melted state possesses the property of effacing writing in almost every deseription of ink, and of destroying many articles of delicate structure—such as certain kinds of jewelry or other articles liable to be affected by the sulphuric acid contained therein. By the addition of a sufficient quantity of alkali to neutralize the acid of the alum or other salt it is deprived of its above-described destructive property.

Of the incombustible earthy matters which may be substituted for clay we will mention brick-dust, pumice-stone, and soapstone, but we do not confine ourselves to these. Of the alkaline substances which may be employed as the neutralizing agent, ashes, lime, or soda may be used with nearly equal advantage. The different ingredients are to be mixed in a pulverized state and may be introduced between the walls of the safe or other structure in that state. The proportions may require to be somewhat varied, as some samples of alum contain more acid than others and some alkalies are stronger than others, but in practice we generally take four (4) parts, by weight, of clay, four (4) parts of alum, and two (2) parts of ashes.

A mixture of alum and marble dust, or the dust from a marble saw-mill, form a compound of essentially the same character as the above, as the marble-dust contains the alkali necessary to neutralize its acid, and also the incombustible matter necessary to give body to the alum to hold it in its place, the latter being the principal object of the clay or other earthy or incombustible matter used with the alum. We have used successfully a mixture of two parts by weight of marble sawdust and one of alum. These may be mixed and inserted cold and dry.

The compounds of alum, clay, &c., heretofore used as heat-resisting media, have possessed another serious defect in addition to the destructive property of the alum, inasmuch as when heated in a burning building they form a soft mud or slush that, settling down to the lowest part of the safe or other fire-proof structure, runs and oozes through the joints thereof not only to the exterior but to the interior of the safe, destroying every fragile substance with which it comes in contact, besides leaving the upper part of the safe or structure empty and exposed to the action of fire. This defect is what we design to obviate by the formation of cells of porous material between the inner and outer walls to contain the compound, the pores of said cells being capable of absorbing, either by capillary attraction or chemical affinity, the soluble portions of the filling and the steam or vapor arising therefrom. The material of which the cells are formed and the manner of constructing them may be varied, but generally any porous substance may be used. We at present form the chambers by breaking brick into lumps of such size and irregular shapes as to touch each other and the sides of the safe, to form a mutual support, so that they cannot settle down, and at the same time do not present flat surfaces to each other, but touch on points. The interstices *b b* (represented in the drawing between these lumps *a a*) constitute the cells which contain the filling, and the pores in the brick form smaller cells to receive the steam or vapor from the filling, or the melted filling itself. Instead of using broken brick it might be advantageous to make bricks or tiles for the purpose, of very porous character, taking care that they do not rest upon each other with flat surfaces, but only touch on points, so that the steam, vapor, or melted filling may circulate freely among them. The porous material of which the cells are constructed will continue during a fire to absorb the steam, vapor, or melted filling until all that is capable of flowing or evaporating is burnt out, and nothing remains but the portion that is incapable of either flowing or evaporating, which will be left in the pores of the material of which the cells are constructed and in the cells themselves, and the porous material and other unmelted and unevaporated portion of the filling remaining form a cellular tissue of the best non-conducting material, having its cells filled with air and gases, which are also poor conductors, the same extending to the top of the safe or structure. We also propose in carrying out this mode of holding up the filling to insert in the interstices *b b* oyster-shells or other shells or solid substances containing lime or other alkali, for the purpose at the same time both of holding up the filling and supplying the neutralizing agent before spoken of in this specification. We also propose to construct bricks or tiles of some porous earth or substance containing in itself the aforesaid neutralizing agent; and we further propose to form porous cells to receive the filling by inserting between the walls sheets, strips, or layers of blanket or other porous textile fabric, the said sheets, strips, or layers having been previously saturated with alum or with the fire-proof compound hereinbefore described, and formed in part of alum.

The packing or covering we employ for the joints, both of the inner and outer walls of the safe, door, or other structure, consists of strips of cloth or other porous flexible material dipped in melted alum or some fire-proof compound consisting in part of alum. These strips are taken before the alum or compound upon them has set hard and placed in the lap of the joint, as shown at *c c*, or over the joint, as shown at *c′ c′*, according as the nature of the joint may require, and will effectively prevent the fire-proof compound oozing through the joints.

Some of the advantages due to certain features or characteristics of our invention may be separately enumerated, as follows:

First. By reason of the fact that our material employed to fill the space between the outer and inner casing is dry and fine, being composed of alum or the like watery crystals in a dry and loose state mingled with clay or the like earthy material in a dry and loose state, as described, it accrues that the space in the structure may be very tightly packed without the shrinking or swelling due to the cooling of melted filling; also, that the material will adapt itself to all conditions or strains to which the safe may be subjected, as in falling to the cellar during a fire without allowing any cracks to form or causing any unequal and rending strains on the structure, and also that the mass is in its early stages a better non-conductor than a hard and dense filling of alum and earths applied melted, and is more inclined to become fluid or pasty on the outside faces alone at first and to throw the vapor of its outer particles inwardly to moisten the interior particles and increase the ability of the inner portion to withstand the heat when it becomes afterward exposed to it.

Second. By reason of the fact that marble-dust or the like material containing alkali in a dry state is mingled with the alum, it accrues that the sulphuric acid of the alum is neutralized in whole or in part and formed into a solid and porous mass and prevented from producing any destructive effect on the valuable contents of the safe, and that this chemical action by inducing a slight foaming or working of the mass, so far as the action proceeds, renders the affected portion pasty and sluggish, instead of fluid and quick to flow, and also tends to fill all gaps or interstices which may be presented, and thus to increase the fire-proof qualities of the safe.

Third. By reason of the addition of our broken brick or the like hard, angular, and porous masses, *a*, it accrues that the structure is less subject to any possible closing together of the outer and inner casing at any point, and that the filling composition is partially supported and its vapor absorbed during the earlier stage of a fire to be made available at later stages.

We are aware that a compound of alum and clay has been used as a fire-proof filling for safes; also, that brick, soft stone, layers of pumice and other porous substances have been used for an interior fire-proof lining or shield for the like purpose; likewise that, in connection with various soft porous fillings between the inner and outer cases of the safe, tubes containing alkaline solutions have been interspersed. None of such, therefore, do we claim, nor yet, as a mere antiphlogistic compound, the combination of an alkali with alum.

Having now fully described this invention, what we claim as new therein, and desire to secure by Letters Patent, is as follows:

1. A safe-filling composed of broken or pulverized alum, or equivalent crystalline material, in a cold and dry state, mingled with earthy matter, substantially in the proportions and for the purpose herein set forth.

2. The use of alum, or equivalent crystalline material, containing acid, in the filling of safes, in combination with marble-dust, or an equivalent dry alkali, as a neutralizer or hardener, substantially as and for the purpose herein set forth.

3. In connection with the above, as a new and useful improvement in fillings of safes or other fire-proof structures, interspersing in the said filling a frame-work of solid substance, arranged substantially in the manner and for the purpose described.

SARAH A. HOLMES.
A. A. VALENTINE.
W. H. BUTLER.

Witnesses to the signature of Sarah A. Holmes and A. A. Valentine:

THOMAS D. STETSON,
D. W. STETSON.

Witnesses to the signature of Wm. H. Butler:

THOMAS D. STETSON,
J. M. MOSSMAN.